(No Model.)
C. S. KAUFMANN.
STORAGE BATTERY.
No. 601,471. Patented Mar. 29, 1898.
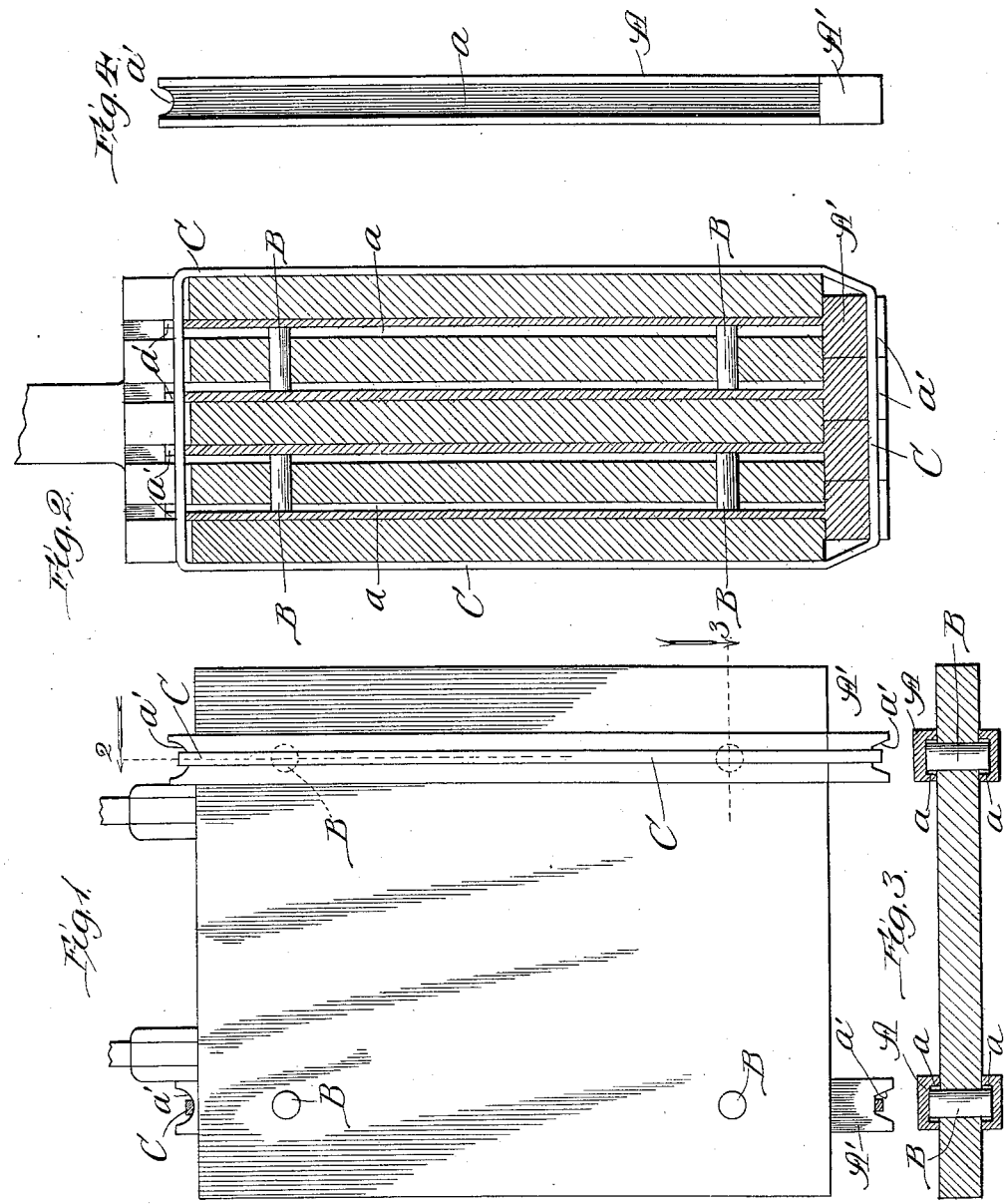
Witnesses:
Luter S. Alter
Thomas B. McGregor
Inventor:
Charles S. Kaufmann,
By Banning & Banning & Sheridan,
Attys.

UNITED STATES PATENT OFFICE.

CHARLES S. KAUFMANN, OF CHICAGO, ILLINOIS, ASSIGNOR TO THE AMERICAN BATTERY COMPANY, OF SAME PLACE.

STORAGE BATTERY.

SPECIFICATION forming part of Letters Patent No. 601,471, dated March 29, 1898.

Application filed September 4, 1897. Serial No. 650,643. (No model.)

*To all whom it may concern:*

Be it known that I, CHARLES S. KAUFMANN, a citizen of the United States, residing at Chicago, Illinois, have invented certain new and useful Improvements in Storage Batteries, of which the following is a specification.

The object of my invention has more particular reference to the insulating-support arranged between the plates forming the cell of a battery; and my invention consists in the features and details of construction hereinafter described and claimed.

In the drawings, Figure 1 is a side elevation of the cell of a battery with the outside plate removed. Fig. 2 is an end elevation of a vertical section, taken in the line 2 2 of Fig. 1, looking in the direction of the arrow. Fig. 3 is a plan view of a section of a plate, taken in the line 3 3 of Fig. 1, looking in the direction of the arrow; and Fig. 4 is a front elevation of an insulating-support.

In arranging the plates which compose a cell of a storage battery it is necessary to insulate them from each other, and it is desirable to support them a desired distance above the bottom of the jar which contains them. One of the difficulties heretofore has been to provide means for insulating the plates from each other and raising them a desired distance above the bottom of the jar, which would remain in place.

In my arrangement I make a desired number of insulating-supports A, channeled, as shown at $a$, though they may be channeled at each side, if desired. These insulating-supports may be made of vulcanized rubber or other suitable material, and they are provided at their lower ends with extending or T-shaped heads A', with shoulders projecting out at each side, as particularly shown in Fig. 2. I prefer to hollow them out at their ends, as shown at $a'$ and $a'$, to facilitate the binding together of the plates composing the cell. I provide some of the plates, preferably each alternate plate entering into the construction of the cell, with insulating-pins B, passing transversely through them and projecting a desired distance beyond their faces. These pins may be of vulcanized rubber or other suitable insulating material and should be of a size to permit their ends to be received in the channel or channels of the insulating-supports. In assembling the plates of a cell the supports should be arranged, as shown in Figs. 2 and 3, with their channels receiving the projecting ends of the pins, so that the plates and insulating-supports may fit snugly together, as shown in Fig. 3. The projecting shoulders of the T-shaped heads A' on the lower ends of the insulating-supports receive the lower edges of the several plates and support them in position, as shown in Fig. 2. The pins received in the channel or channels of the insulating-supports prevent lateral movement or displacement of the supports and hold them in the desired proper position. After the plates composing the cell have all been assembled in place a rubber cord or band C may be sprung around them, passing through the grooves $a'$ in the ends of the insulating-supports, as shown in Fig. 1, although other means may be employed, if desired, for binding or retaining the plates of the cell in their assembled condition.

By making the insulating-supports as separate T-headed pieces they may be made thin enough to secure the desired elasticity to the cell considered as a complete structure, thus preventing it from being broken by sudden shocks, as has been incident to the means heretofore used for insulating the plates in assembling the cell. By providing them with a channel or channels into which a projection on the faces of the plates may be received they are secured from lateral displacement. In addition to these structural advantages I have found from actual use that my insulating-supports can be made and used with considerable saving in expense over the usual means employed for such purpose.

What I regard as new, and desire to secure by Letters Patent, is—

1. In a storage-battery cell, the combination of plates, insulating-supports arranged between them and provided with longitudinal channel or channels, and pins formed of insulating material projecting from the faces of some of the plates with their ends received into the grooves or channels in the insulating-supports, substantially as described.

2. In a storage-battery cell, the combination of plates, insulating-supports arranged between them provided with T-shaped lower ends and a longitudinal channel or channels, and pins projecting from the faces of some of the plates with their ends received into the grooves or channels in the insulating-supports, substantially as described.

CHARLES S. KAUFMANN.

Witnesses:
 THOMAS A. BANNING,
 THOMAS B. MCGREGOR.